Figure 1:
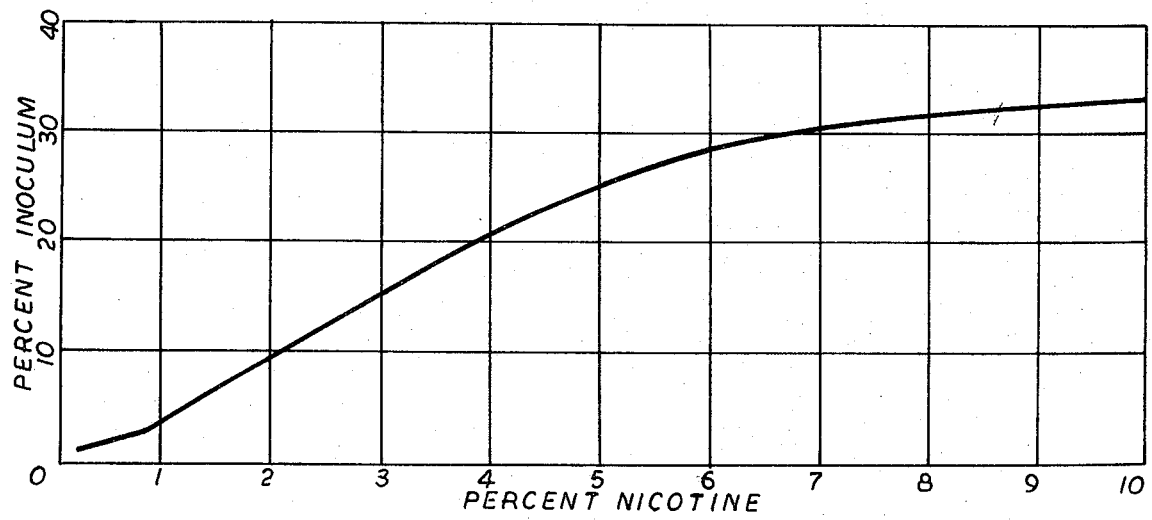

United States Patent
Squires et al.

[15] 3,644,176
[45] Feb. 22, 1972

[54] SYNTHESIS OF 6-HYDROXYNICOTINE

[72] Inventors: William C. Squires; Lawrence E. Hayes, both of Winston-Salem, N.C.

[73] Assignee: R. J. Reynolds Tobacco Company, Winston-Salem, N.C.

[22] Filed: May 14, 1969

[21] Appl. No.: 824,498

[52] U.S. Cl. ................................................195/51 R
[51] Int. Cl. ..................................................C12d 13/00
[58] Field of Search ...............................195/28, 51; 260/291

[56] References Cited

UNITED STATES PATENTS 3,139,435   6/1964   Staley et al. ...........................260/291

OTHER PUBLICATIONS

Gherna et al., J. Biol. Chem. Vol. 240 No. 9 pages 3669–3674 (1965).

Hochstein et al., J. Biol. Chem. Vol. 234 pages 151–160 (1959).

*Primary Examiner*—Alvin E. Tanenholtz
*Attorney*—Pendleton, Neuman, Williams & Anderson

[57] ABSTRACT

Process for preparing 6-hydroxynicotine by conversion of nicotine using Arthrobacter oxydans micro-organisms.

8 Claims, 2 Drawing Figures

INVENTORS
WILLIAM C. SQUIRES
LAWRENCE E. HAYES
BY: Pendleton, Neuman
Seibold & Williams
ATTY'S

SYNTHESIS OF 6-HYDROXYNICOTINE

This invention relates to a process of preparing 6-hydroxynicotine from nicotine.

Attempts have heretofore been made to convert nicotine to 6-hydroxynicotine by means of micro-organisms, but these prior attempts have not been practically successful since only very low concentrations such as on the order of 0.5 percent by weight of nicotine could be treated. As is known, 6-hydroxynicotine is a useful compound and can, for example, be employed in conventional esterification processes as an intermediate for preparation of 6-alkoxynicotine derivatives such as (-)6-decyloxynicotine tartrate and (-)6-octyloxynicotine tartrate which compounds possess antibacterial and antifungal properties.

It is a principal object of this invention to provide a process for efficiently converting nicotine in high concentrations to 6-hydroxynicotine.

Thus, in accordance with the present invention nicotine if not pure (crude) is purified to remove therefrom contaminants which tend to inhibit its conversion to 6-hydroxynicotine by the action of micro-organisms. After purification or removal of the growth or enzyme inhibiting contaminants the nicotine is converted to 6-hydroxynicotine by fermentation with a selected strain of *Arthrobacter oxydans*, α2.

In a preferred embodiment of the invention a commercial grade nicotine obtained from plant sources is dissolved in water to a concentration up to about 20 percent by weight. The solution is acidified as, for example, with sulfuric acid or like acids to a pH of about 5.4. When aqueous solutions of nicotine are acidified, flocculation occurs and clumps of material form upon aeration. Preferably the acidified nicotine solution is filtered without prior aeration through a solid absorbent such as decolorizing carbon or diatomaceous earth or mixtures thereof. Less preferably, the acidified nicotine solution can be sparged with air and then the flocculent in the form of clumps separated by filtration or otherwise. The flocculent formed by acidification of the nicotine solution is believed to include substances which inhibit the growth or enzymatic efficiency of the micro-organisms in converting the nicotine to 6-hydroxynicotine. Means, such as decantation and the like, of separating the flocculent other than filtration can be employed. Separation of the flocculent from the acidified nicotine solution permits conversion of higher concentrations of nicotine.

After purification the nicotine is subjected to microbiological conversion. To this end an aqueous fermentation medium containing say from 0.5 to 20 percent by weight of the purified nicotine and a small amount of a suitable nitrogen source such as corn steep liquor is prepared and this medium in inoculated with a selected culture of *Arthrobacter oxydans*, α2. The fermentation is carried out by aerating and agitating the mixture at a temperature of about 25° to 35° C., preferably 30° C., for a period generally ranging from about 24 to 72 hours. The fermentation is carried out at any pH suitable for growth and metabolism of the culture (i.e., from about 5.0 to 6.0 and preferably from about 5.2 to 5.6).

When the fermentation process reaches completion the microbiological activity is stopped by acidification and the cells removed by centrifugation. The liquor is then concentrated as by evaporation or distillation, clarified and the 6-hydroxynicotine extracted with a selective solvent such as chloroform, tetrachloroethylene, methylene chloride, ethylene dichloride, carbon tetrachloride and the like. The recovered 6-hydroxynicotine can, if desired, be recrystallized from hexane and like solvents. Preferably hot halogenated hydrocarbon solvents are used employing continuous liquid-liquid extraction techniques. The solvent is employed at an elevated temperature below its boiling point; higher solvent temperatures usually affording greater extraction efficiency.

It has been found in accordance with the present invention that a particular strain of *Arthrobacter oxydans*, α2 is exceptionally advantageous for the purpose of the present invention. The strain of *Arthrobacter oxydans*, α2 which is employed in accordance with this invention is one originally isolated from soil and tobacco as described in *Bergey Manual of Determinative Bacteriology*, 7th Edition, 1957, William & Wilkins, page 608. Upon cultivation on nutrient agar at 25° C. for 4–5 days the organism produces entirely cream-colored, umbonate colonies with entire edges. Usually no segments of cream-colored colonies can be colored differently when observed under a microscope with 70-power magnification. A subculture of this organism can be obtained from the permanent collection of the Northern Utilization Research and Development Division, Agricultural Research Service, United States Department of Agriculture, Peoria, Illinois. Its accession number in this repository is NRRL-B-3603.

In one embodiment a culture of this organism is prepared by cultivation of the selected *Arthrobacter oxydans*, α2 organism on an agar medium containing 0.2 percent nicotine and 0.6 percent corn steep liquor (50 percent solids) and which is buffered at pH 5.5. It is then serially transferred to the nicotine-containing nutrient broth to form the desired inoculum. During the fermentation of the final inoculated broth containing the nicotine to be oxidized, the medium is aerated and agitated. Because aeration provides agitation, the rate of aeration can be reduced as mechanical agitation is increased or vice versa. Aeration and agitation can be varied so as to obtain maximum yield. Generally, introducing air into the fermentation mass at rates of from 0.2 to 0.7 cubic feet per minute per 30 gallons thereof is advantageous.

The following examples further illustrate the present invention.

EXAMPLE I

A 25 percent aqueous (tap water) solution of nicotine obtained from plant sources was acidified to pH 5.3 to 5.4 with sulfuric acid with continuous stirring. Twenty-five grams/liter each of diatomaceous earth and decolorizing carbon were added and stirring continued for about 15 minutes. The mixture was filtered and the solid phase washed with 22 milliliters of water per 100 milliliters of the original solution.

A fermentation medium was prepared which consisted of 1.6 percent corn steep liquor (50 percent solids) and nicotine solution to provide a final nicotine concentration of 10 percent and adjusting to pH 5.2 to 5.6 with sodium hydroxide or sulfuric acid as required. The medium was sterilized by autoclaving.

After cooling it was inoculated in 10-liter deep culture fermentors with 33 percent by volume of a 14 ½ hour pure broth culture of the specified strain of *Arthrobacter oxydans*, α2. Agitation was begun at 300 revolutions per minute with aeration at the rate of 0.48 cubic feet per minute. The temperature was maintained at 30 ± 1° C. for 43 ½ hours.

The yield of 6-hydroxynicotine based upon ultraviolet absorption at 292 $\mu$ was 83 percent of theoretical. When the ultraviolet absorption failed to increase, the fermentation was quickly stopped by cooling simultaneously with the addition of hydrochloric acid to pH 2. The cells were promptly removed by continuous centrifugation.

The mother liquor was concentrated sevenfold at 41° C. in a steam heated evaporator at reduced pressure. Barium hydroxide was added to the concentrate to provide a pH of 10. One-hundred fifty grams of diatomaceous earth per liter of alkaline concentrate were added and the mixture filtered. Another 75 grams per liter of diatomaceous earth were added to the filtrate and the mixture filtered again to obtain a clear amber solution. Two liters of water were used to wash sequentially the filter beds of each 6 liters of concentrated liquor.

The clarified liquors were extracted continuously within a liquid-liquid extractor for 24 hours with 1 ½ times its volume of hot chloroform. The extract was concentrated by distillation to about one-fifth of its original volume. An equal volume of heptane was added and the distillation continued to a head temperature of 94° C. at atmospheric pressure. The hot concentrate was then poured into one-half its volume of cold heptane with vigorous stirring to obtain a heavy suspension of tan crystals of 6-hydroxynicotine. The 6-hydroxynicotine crystals were separated by filtration and air dried.

EXAMPLE II

A 25 percent aqueous (tap water) solution of impure nicotine obtained from plant sources was acidified to pH 5.3 to 5.4 with sulfuric acid with continuous stirring. Twenty-five grams/liter each of diatomaceous earth and decolorizing carbon were added and stirring continued for about 15 minutes. The mixture was filtered and the solid phase washed with 22 milliliters of water per 100 milliliters of the original solution.

A corn steep liquor containing 50 percent solids was sterilized in an aqueous medium by autoclaving. Sufficient quantities of the purified but unsterilized nicotine solution were added to give a final nicotine concentration of 10 percent and corn steep liquor concentration of 1.6 percent. The resulting mixture was adjusted to pH 5.2 to 5.6 using sodium hydroxide or sulfuric acid as required.

This fermentation medium was then inoculated in 10-liter deep culture fermentors with 33 percent by volume of a 14 ½ hour pure broth culture of the specified strain of *Arthrobacter oxydans*, α2. Agitation was begun at 200 revolutions per minute with aeration at the rate of 0.67 cubic feet per minute. The temperature was maintained at 30°± 1° C. for 72.5 hours.

The yield of 6-hydroxynicotine based upon ultraviolet absorption at 292 $\mu$ was 91 percent of theoretical. When the ultraviolet absorption failed to increase, the fermentation was quickly stopped by cooling simultaneously with the addition of hydrochloric acid to pH 2. The cells were promptly removed by continuous centrifugation.

The mother liquor was concentrated sevenfold at 41° C. in a steam heated evaporator at reduced pressure. Barium hydroxide was added to the concentrate to provide a pH of 10. One-hundred fifty grams of diatomaceous earth per liter of alkaline concentrate were added and the mixture filtered. Another 75 grams per liter of diatomaceous earth were added to the filtrate and the mixture filtered again to obtain a clear amber solution. Two liters of water were used to wash sequentially the filter beds of each 6 liters of concentrated liquor.

The clarified liquors were extracted continuously within a liquid-liquid extractor for 24 hours with 1 ½ times its volume of hot chloroform. The extract was concentrated by distillation to about one-fifth of its original volume. An equal volume of heptane was added and the distillation continued to a head temperature of 94° C. at atmospheric pressure. The hot concentrate was then poured into one-half its volume of cold heptane with vigorous stirring to obtain a heavy suspension of tan crystals of 6-hydroxynicotine. The 6-hydroxynicotine crystals were separated by filtration and air dried.

EXAMPLE III

A 25 percent aqueous (tap water) solution of nicotine obtained from plant sources was acidified to pH 5.3 to 5.4 with sulfuric acid with continuous stirring. Twenty-five grams/liter each of diatomaceous earth and decolorizing carbon were added and stirring continued for about 15 minutes. The mixture was filtered and the solid phase washed with 22 milliliters of water per 100 milliliters of the original solution.

A fermentation medium was prepared which consisted of 1.6 percent corn steep liquor (50 percent solids) and nicotine solution to provide a final nicotine concentration of 10 percent and adjusting to pH 5.2 to 5.6 with sodium hydroxide or sulfuric acid as required. The medium was sterilized by autoclaving.

After cooling it was inoculated in 10-liter deep culture fermentors with 33 percent by volume of a 14½ hour pure broth culture of the specified strain of *Arthrobacter oxydans*, α2. Agitation was begun at 300 revolutions per minute with aeration at the rate of 0.22 cubic feet per minute. The temperature was maintained at 30 ± 1° C. for 49.33 hours.

The yield of 6-hydroxynicotine based upon ultraviolet absorption at 292 $\mu$ was 93 percent of theoretical. When the ultraviolet absorption failed to increase, the fermentation was quickly stopped by cooling simultaneously with the addition of hydrochloric acid to pH 2. The cells were promptly removed by continuous centrifugation.

The mother liquor was concentrated sevenfold at 41° C. in a steam heated evaporator at reduced pressure. Barium hydroxide was added to the concentrate to provide a pH of 10. One-hundred fifty grams of diatomaceous earth per liter of alkaline concentrate were added and the mixture filtered. Another 75 grams per liter of diatomaceous earth were added to the filtrate and the mixture filtered again to obtain a clear amber solution. Two liters of water were used to wash sequentially the filter beds of each 6 liters of concentrated liquor.

The clarified liquors were extracted continuously within a liquid-liquid extractor for 24 hours with 1½ times its volume with hot chloroform. The extract was concentrated by distillation to about one-fifth of its original volume. An equal volume of heptane was added and the distillation continued to a head temperature of 94° C. at atmospheric pressure. The hot concentrate was then poured into one-half its volume of cold heptane with vigorous stirring to obtain a heavy suspension of tan crystals of 6-hydroxynicotine. The 6-hydroxynicotine crystals were separated by filtration and air dried.

Figure 2:
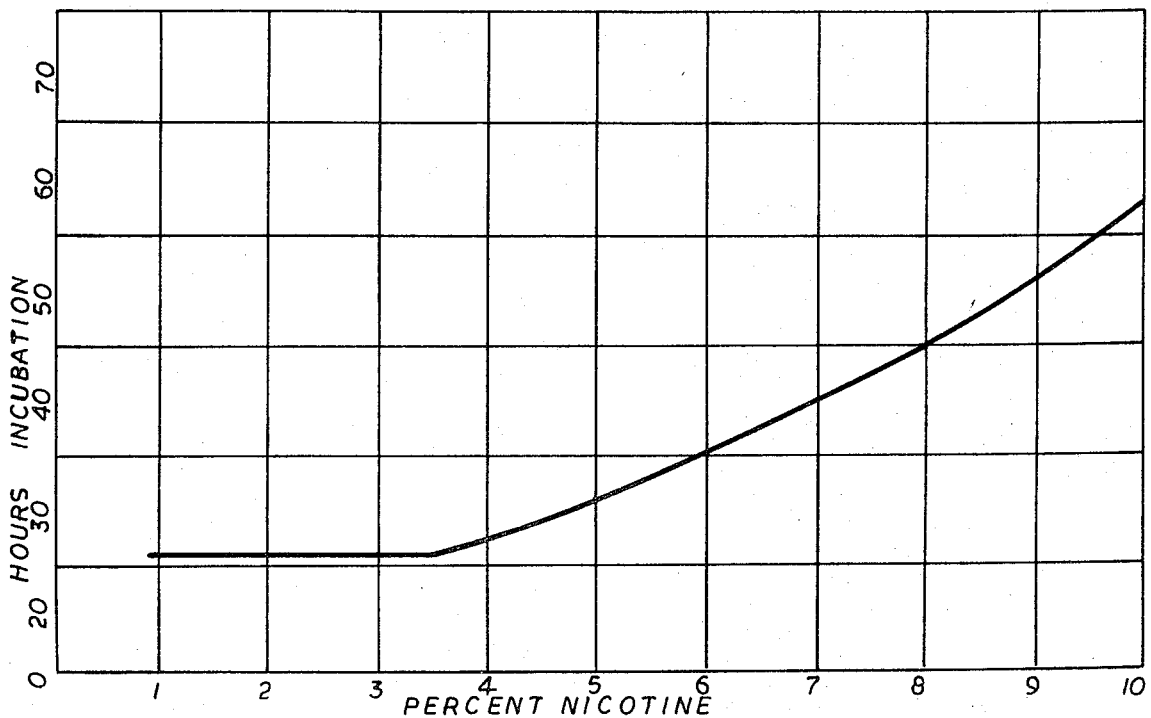

The amount of the bacterial inoculum employed in the deep culture fermentation of nicotine is interdependent upon the concentration of nicotine to be converted, concentration of nutrient (corn steep liquor, for example), pH and time and temperature employed in the incubation. FIG. 1 illustrates the relationship of the amount of inoculum to the concentration of nicotine. The relationship between time of incubation and concentration of nicotine is illustrated in FIG. 2.

Two important features with respect to accomplishing the desired objectives of the invention are the purification of nicotine, that is, removal of enzyme inhibitory contaminants therefrom and the use of a particular strain of *Arthrobacter oxydans*, α2. The importance of purification of the nicotine prior to fermentation is illustrated by the data shown in Table I.

TABLE I.—EFFECT OF FILTRATION THROUGH DECOLORIZING CARBON ON THE FERMENTABILITY OF 5% AND HIGHER CONCENTRATIONS OF NICOTINE [1]

| Nicotine concentration (percent) | Purification method | Yield of 6-hydroxynicotine (percent) |
|---|---|---|
| 5 | Acidification and aeration | None |
| 5 | Acidification, aeration and filtration | 86.5 |
| 6 | do | 93.9 |
| 7 | do | 72.7 |

[1] Medium—CSL: 1.2% (corn sseep liquor containing 50% solids) Initial pH: 5.2 (adjusted with NaOH and H₂SO₄); Aeration Rate: 85 ml./500 ml. Erlenmeyer shake flask; Temperature: 30° C.; Inoculum; 25% whole culture.

As can be seen from the above, when the enzyme inhibitory substances were not removed the conversion of nicotine to 6-hydroxynicotine was not successful.

The advantages of the present invention are believed apparent from the foregoing. Thus, the present invention affords a practical deep culture process for the conversion of nicotine to 6-hydroxynicotine utilizing relatively high concentrations of nicotine. High yields of 6-hydroxynicotine can be obtained. Another important advantage of the invention is the fact that nicotine concentrations greater than 5 percent can be used. Nicotine concentrations of about 5 percent or greater inhibit the growth of most micro-organisms thereby virtually eliminating competition for the nutrients by contaminating organisms. This inhibitory effect also makes sterilization of the fermentation medium unnecessary as exemplified by Example II. The disclosed process is adaptable for continuous operation.

Those modifications and equivalents which fall within the spirit of the invention are to be considered a part thereof.

We claim:

1. A process for producing 6-hydroxynicotine which comprises incubating under fermentation conditions a nutrient medium containing nicotine in an amount from 2 to up to about 20 percent by weight with said medium being inoculated with *Arthrobacter oxydans*, α2 (NRRL–B–3603).

2. A process in accordance with claim 1 wherein the fermentation is carried out at a temperature of about 25° to 35° C. and at a pH from about 5.0 to 6.0.

3. A process in accordance with claim 1 wherein the nutrient medium contains nicotine in an amount of about 5 percent by weight.

4. A process in accordance with claim 1 wherein the nutrient medium contains nicotine in an amount of about 10 percent by weight.

5. A process for producing 6-hydroxynicotine which comprises acidifying an aqueous solution of impure nicotine to achieve flocculation, separating the flocculent, incubating under fermentation conditions the so-purified nicotine in a nutrient medium with *Arthrobacter oxydans*, α2 (NRRL–B–3603), the nicotine being present in said nutrient medium in an amount from about 2 to 20 percent by weight, and recovering 6-hydroxynicotine.

6. A process in accordance with claim 5 wherein the fermentation is carried out in a nonsterile nutrient medium.

7. A process in accordance with claim 5 wherein the fermentation is carried out in a sterile nutrient medium.

8. A process in accordance with claim 5 wherein the fermentation is carried out at a temperature of about 25° to 35° C. and at a pH from about 5.0 to 6.0 for a period of time ranging from approximately 24 to 72 hours.

* * * * *

UNITED STATES PATENT OFFICE
CERTIFICATE OF CORRECTION

Patent No. 3,644,176             Dated February 22, 1972

Inventor(s) William C. Squires and Lawrence E. Hayes

It is certified that error appears in the above-identified patent and that said Letters Patent are hereby corrected as shown below:

Column 2, line 53, "µ" should be -- mµ --

Column 3, line 27, "µ" should be -- mµ -- line 75, "µ" should be -- mµ --

Column 4, line 53, "sseep" should be -- steep --

Signed and sealed this 20th day of June 1972.

(SEAL)
Attest:

EDWARD M. FLETCHER, JR.            ROBERT GOTTSCHALK
Attesting Officer                     Commissioner of Patents